(12) United States Patent
Thistle et al.

(10) Patent No.: US 10,047,611 B2
(45) Date of Patent: Aug. 14, 2018

(54) TURBINE BLADE ATTACHMENT CURVED RIB STIFFENERS

(71) Applicant: United Technologies Corporation, Hartford, CT (US)

(72) Inventors: Charles Thistle, Middletown, CT (US); Mohamed Hassan, Palm City, FL (US)

(73) Assignee: United Technologies Corporation, Farmington, CT (US)

( * ) Notice: Subject to any disclaimer, the term of this patent is extended or adjusted under 35 U.S.C. 154(b) by 288 days.

(21) Appl. No.: 15/009,366

(22) Filed: Jan. 28, 2016

(65) Prior Publication Data

US 2017/0218776 A1    Aug. 3, 2017

(51) Int. Cl.
*F01D 5/30*    (2006.01)
*F01D 5/14*    (2006.01)
(Continued)

(52) U.S. Cl.
CPC .............. *F01D 5/147* (2013.01); *F01D 5/18* (2013.01); *F01D 5/3007* (2013.01); *F01D 5/3038* (2013.01); *F01D 5/081* (2013.01); *F01D 5/082* (2013.01); *F01D 5/323* (2013.01); *F01D 5/326* (2013.01); *F05D 2220/32* (2013.01); *F05D 2230/00* (2013.01); *F05D 2230/411* (2013.01); *F05D 2230/53* (2013.01); *F05D 2230/90* (2013.01); *F05D 2240/24* (2013.01); *F05D 2240/30* (2013.01); *F05D 2250/141* (2013.01); *F05D 2250/712* (2013.01);
(Continued)

(58) Field of Classification Search
CPC .......... F01D 5/3007; F01D 5/30; F01D 5/323; F01D 5/326; F01D 5/18; F01D 5/081; F01D 5/082
See application file for complete search history.

(56) References Cited

U.S. PATENT DOCUMENTS

| 7,690,896 B2 | 4/2010 | Stevens |
| 7,708,525 B2 | 5/2010 | Cherolis |

(Continued)

FOREIGN PATENT DOCUMENTS

| EP | 2143881 | 1/2010 |
| EP | 2436883 | 4/2012 |

(Continued)

OTHER PUBLICATIONS

FR 3043133—Translation and Original from Espacenet.*

(Continued)

*Primary Examiner* — Jason Shanske
*Assistant Examiner* — Behnoush Haghighian
(74) *Attorney, Agent, or Firm* — Snell & Wilmer L.L.P.

(57) ABSTRACT

The present disclosure provides a fir tree coupling for gas turbine engine parts comprising a load beam having a longitudinal axis, a rounded base, a first side, and a second side, wherein the rounded base has a radius of curvature from the first side to the second side, a tooth running parallel to the longitudinal axis and disposed on the first side of the load beam. The fir tree coupling may comprise a channel through the rounded base across a portion of the radius of curvature from the first side to the second side. The channel may comprise a sidewall having a sidewall step cut into a portion of the channel sidewall.

18 Claims, 15 Drawing Sheets

(51) Int. Cl.
  *F01D 5/18* (2006.01)
  *F01D 5/08* (2006.01)
  *F01D 5/32* (2006.01)

(52) U.S. Cl.
  CPC .. *F05D 2260/941* (2013.01); *F05D 2300/133* (2013.01); *F05D 2300/174* (2013.01); *F05D 2300/175* (2013.01); *F05D 2300/177* (2013.01); *F05D 2300/605* (2013.01); *F05D 2300/607* (2013.01)

(56) References Cited

U.S. PATENT DOCUMENTS

| | | |
|---|---|---|
| 7,758,309 B2 | 7/2010 | Bolms |
| 8,277,186 B2 | 10/2012 | Tanaka |
| 8,573,942 B2 | 11/2013 | Strohl |
| 9,328,622 B2 | 5/2016 | Garcia-Crespo |
| 2005/0224144 A1* | 10/2005 | Pollock ................ C22C 19/057 148/404 |
| 2015/0037161 A1 | 2/2015 | Kaltenbach |
| 2016/0146016 A1* | 5/2016 | Johns ..................... F01D 5/081 416/1 |
| 2016/0265378 A1 | 9/2016 | Dungs |
| 2017/0067356 A1* | 3/2017 | Vogel ....................... F01D 5/18 |

FOREIGN PATENT DOCUMENTS

| | | | |
|---|---|---|---|
| EP | 2896786 | 7/2015 | |
| FR | 2275975 | 1/1976 | |
| FR | 3043133 | 5/2017 | |
| FR | 3043133 A1 * | 5/2017 | ............. F01D 5/081 |
| GB | 2030657 | 4/1980 | |

OTHER PUBLICATIONS

European Search Report dated Jul. 3, 2017 in EP Application No. 17153620.4.
European Patent Office, European Search Report dated Mar. 29, 2017 in European Application No. 17153625.3-1610.
USPTO, Preinterview First Office Action dated Feb. 14, 2018 in U.S. Appl. No. 15/009,328.
USPTO, Notice of Allowance dated May 15, 2018 in U.S. Appl. No. 15/009,328.

* cited by examiner

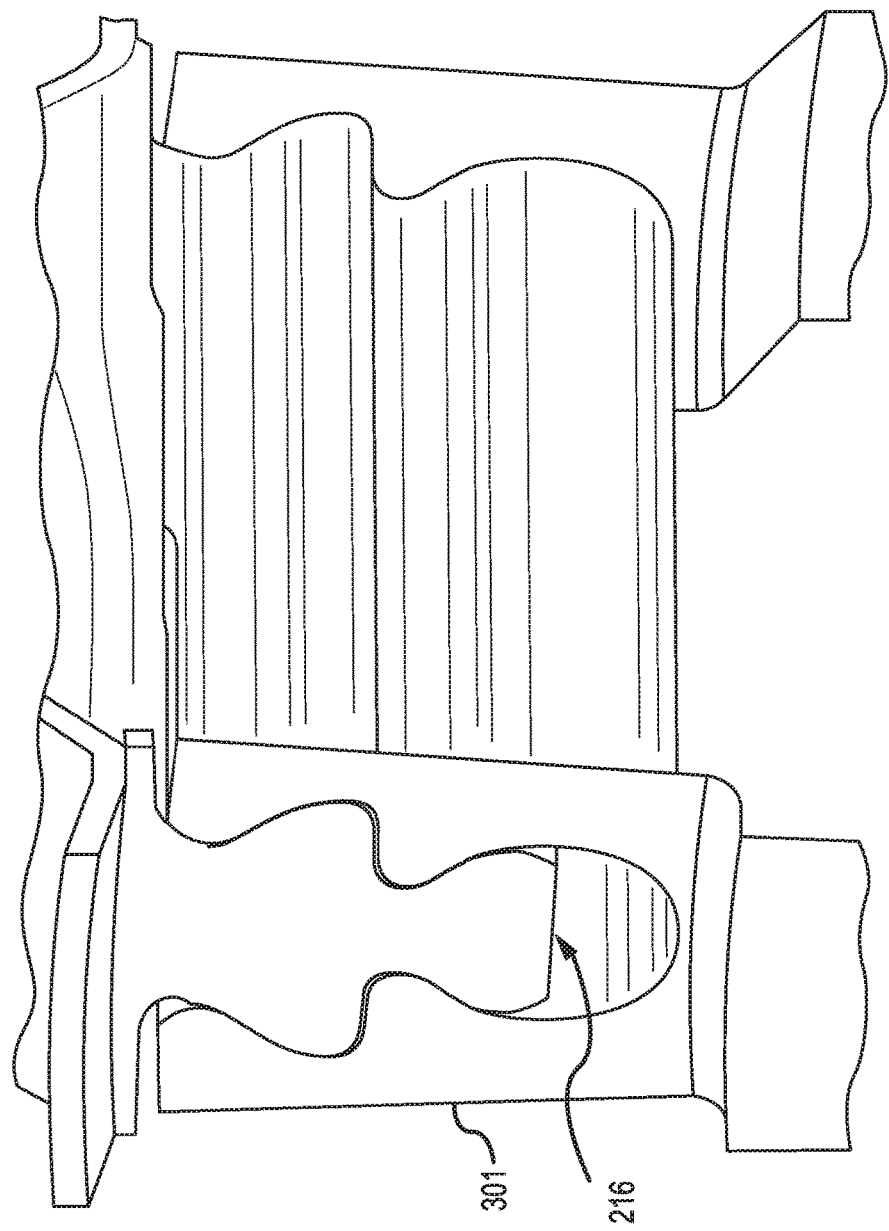

TURBINE BLADE ATTACHMENT CURVED RIB STIFFENERS

FIELD

The present disclosure relates to gas turbine engines, and more specifically, to turbine blade to disk interface and attachment structures.

BACKGROUND

Low Cycle Fatigue (LCF) is a failure mechanism that may limit the in-service life of turbine airfoils, such as blades. Cracks may be initiated by LCF in turbine airfoils after a number of engine cycles. High stresses may arise due to the geometry of the turbine airfoil. In 'fir tree' type couplings between a turbine disk and a turbine blade, these stresses often arise in the attachment fillets adjacent to (radially outboard of) the blade-disk bearing surface.

SUMMARY

In various embodiments, the present disclosure provides a fir tree coupling comprising a load beam having a longitudinal axis, a rounded base, a first side, and a second side, wherein the rounded base has a radius of curvature from the first side to the second side, a tooth running parallel to the longitudinal axis and disposed on the first side of the load beam.

In various embodiments, the fir tree coupling comprises a channel through the rounded base across a portion of the radius of curvature from the first side to the second side. In various embodiments, the channel comprises a sidewall having a sidewall step cut into a portion of the channel sidewall. In various embodiments, the channel comprises at least one of a concave sidewall having a concave curvature into the rounded base, a vertical sidewall extending perpendicular into the rounded base, or a wide channel wherein the wide channel extends across the length of the load beam between a first portion at a first end of the wide channel and a second portion at a second end of the wide channel. In various embodiments, the channel comprises a tapered sidewall wherein the tapered sidewall extends at an angle into the rounded base. In various embodiments, the channel is disposed at an angle to the longitudinal axis of the load beam. In various embodiments the tooth includes a bearing surface. In various embodiments, the load beam comprises a top surface and a cooling passage passing through the load beam from the rounded base to the top surface. In various embodiments, the load beam comprises at least one of nickel, nickel alloy, titanium, or titanium alloy. In various embodiments, the load beam comprises a monocrystalline material.

In various embodiments, the present disclosure provides a blade assembly for a gas turbine engine comprising a platform having a dorsal surface and ventral surface, an airfoil extending from the dorsal surface, a fir tree coupling extending from the ventral surface, the fir tree coupling comprising a load beam having a longitudinal axis, a rounded base, a first side, and a second side, wherein the rounded base has a radius of curvature from the first side to the second side, a tooth running parallel to the longitudinal axis and disposed on the first side of the load beam.

In various embodiments, the fir tree coupling comprises a channel through the rounded base across a portion of the radius of curvature from the first side to the second side. In various embodiments, the channel comprises a sidewall having a sidewall step cut into a portion of the channel sidewall. In various embodiments, the channel comprises at least one of a concave sidewall having a concave curvature into the rounded base, a vertical sidewall extending perpendicular into the rounded base, or a wide channel wherein the wide channel extends across the length of the load beam between a first portion at a first end of the wide channel and a second portion at a second end of the wide channel. In various embodiments, the channel comprises a tapered sidewall wherein the tapered sidewall extends at an angle into the rounded base. In various embodiments, the channel is disposed at an angle to the longitudinal axis of the load beam. In various embodiments, the fir tree coupling comprises a first cooling passage in fluid communication with a second a cooling passage within at least one of the platform or the airfoil. In various embodiments, the fir tree coupling comprises at least one of nickel, nickel alloy, titanium, or titanium alloy. In various embodiments, the fir tree coupling comprises a monocrystalline material.

In various embodiments, the present disclosure provides a method of manufacturing a fir tree coupling comprising forming a load beam having a longitudinal axis, a rounded base, a first side, a second side, and a tooth running parallel to the longitudinal axis and disposed on the first side of the load beam. In various embodiments, the method further comprises forming a radius of curvature on the rounded base from the first side to the second side. In various embodiments, the method further comprises forming a channel through the rounded base across a portion of the radius of curvature from the first side to the second side of the load beam.

BRIEF DESCRIPTION OF THE DRAWINGS

FIG. 5B illustrates a section through the blade-disk attachment region within a channel through the rounded base of a fir tree coupling, in accordance with various embodiments;

Figure 1:
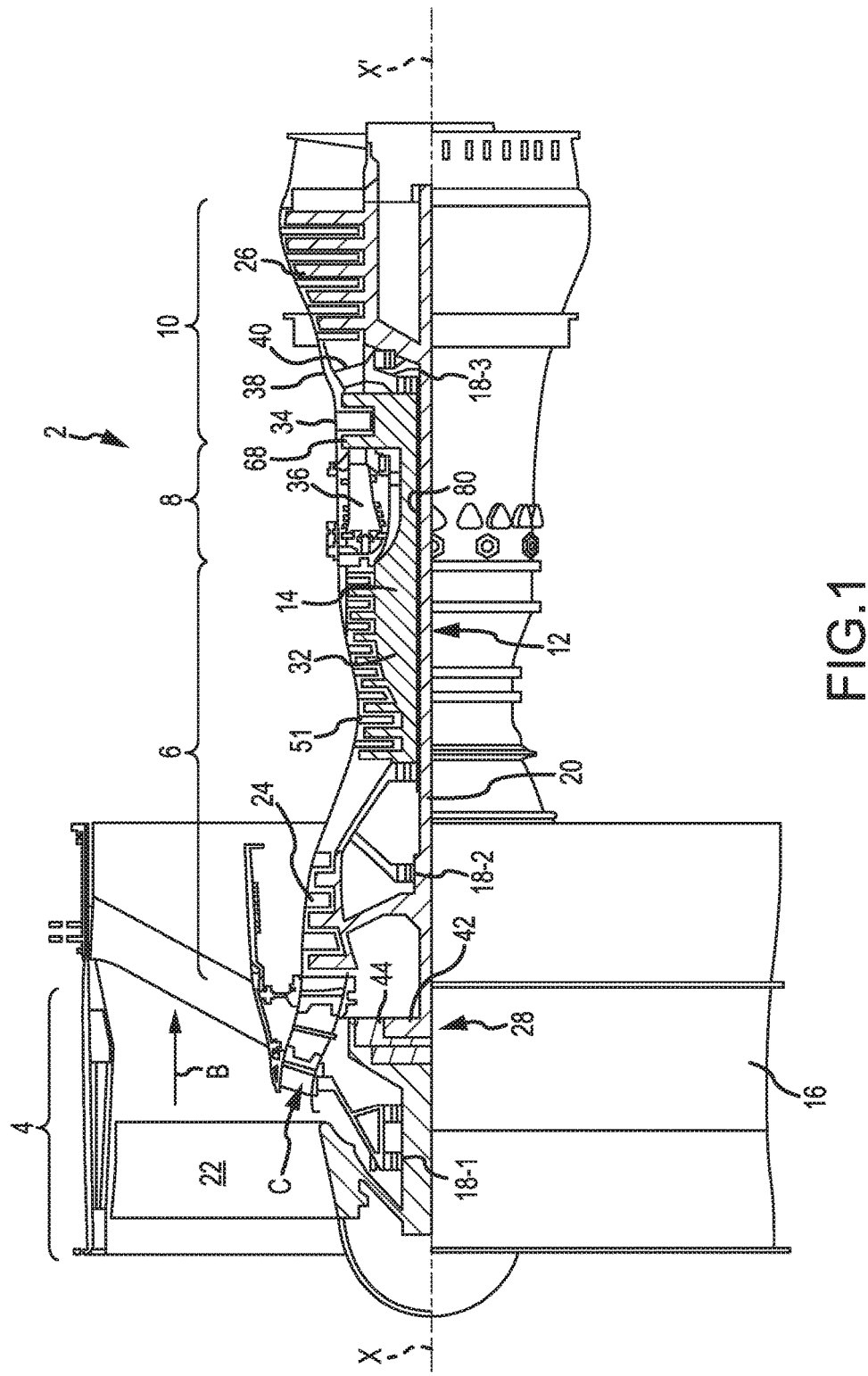
FIG. 1 is a schematic view of a gas turbine engine.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

All ranges and ratio limits disclosed herein may be combined. It is to be understood that unless specifically stated otherwise, references to "a," "an," and/or "the" may include one or more than one and that reference to an item in the singular may also include the item in the plural.

With reference to FIG. 1, an exemplary gas turbine engine 2 is provided. Gas turbine engine 2 is a two-spool turbofan that generally incorporates a fan section 4, a compressor section 6, a combustor section 8 and a turbine section 10. Vanes 51 may be disposed throughout the gas turbine engine 2. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

Gas turbine engine 2 is, for example, a high-bypass geared aircraft engine. The bypass ratio of gas turbine engine 2 is optionally greater than about six (6). The bypass ratio of gas turbine engine 2 is optionally greater than ten (10). Geared architecture 28 is an epicyclic gear train, such as a star gear system, e.g., sun gear in meshing engagement with a plurality of star gears supported by a carrier and in meshing engagement with a ring gear, or other gear system. Geared architecture 28 has a gear reduction ratio of greater than about 2.3 and low pressure turbine section 26 has a pressure ratio that is greater than about five (5). The bypass ratio of gas turbine engine 2 is greater than about ten (10:1). The diameter of fan 22 is significantly larger than that of the low pressure compressor section 24, and the low pressure turbine section 26 has a pressure ratio that is greater than about 5:1. Low pressure turbine section 26 pressure ratio is measured prior to inlet of low pressure turbine section 26 as related to the pressure at the outlet of low pressure turbine section 26 prior to an exhaust nozzle. It should be understood, however, that the above parameters are exemplary of a suitable geared architecture engine and that the present disclosure contemplates other turbine engines including direct drive turbofans.

An engine 2 may comprise a rotor blade 68 or a stator vane 51. Stator vanes 51 may be arranged circumferentially about the engine central longitudinal axis X-X'. Stator vanes 51 may be variable, meaning the angle of attack of the airfoil of the stator vane may be variable relative to the airflow proximate to the stator vanes 51. The angle of attack of the variable stator vane 51 may be variable during operation, or may be fixable for operation, for instance, being variable during maintenance or construction and fixable for operation. In various embodiments, it may be desirable to affix a variable vane 51 in fixed position (e.g., constant angle of attack).

In various embodiments, a fir tree coupling is disclosed for interfacing an airfoil (e.g., a blade) with a turbine disk of a gas turbine engine. A fir tree coupling, according to various embodiments, may comprise a load beam having a longitudinal axis, a rounded base, a first side, and a second side. In various embodiments, the rounded base may have a radius of curvature. The fir tree coupling may comprise a plurality of teeth running parallel or substantially parallel to the load beam longitudinal axis and disposed on the first side and the second side of the load beam. In various embodiments, the teeth have bearing surfaces which transmit loads at the blade-disk interface. The blade-disk interface load may be concentrated as a high stress in an attachment fillet disposed between the teeth of the fir tree coupling. The rounded base of the fir tree coupling may comprise a radius of curvature between the first side and the second side which may reduce attachment fillet stress and tend to mitigate LCF.

In various embodiments, a blade assembly may comprise a fir tree coupling, an airfoil, and a platform having a dorsal and a ventral surface. The airfoil extends from the dorsal surface of the platform and the fir tree coupling extends from the ventral surface of the platform. The blade assembly is coupled to a turbine disk by the fir tree coupling which transmits the centrifugal force acting on the airfoil resulting from the airfoil's rotation about the gas turbine engine shaft to the turbine disk through the bearing surfaces of the fir tree coupling teeth. The centrifugal force induces bending in the teeth which tends to concentrate stresses at the lower most attachment fillet between the teeth. The aforesaid stress concentrations may propagate cracking which tends to drive LCF. In various embodiments, the rounded base of the fir tree coupling tends to resist tooth bending by compression of the rounded base material across the radius of curvature reducing attachment fillet stresses, and thereby tending to mitigate LCF.

Figure 2:
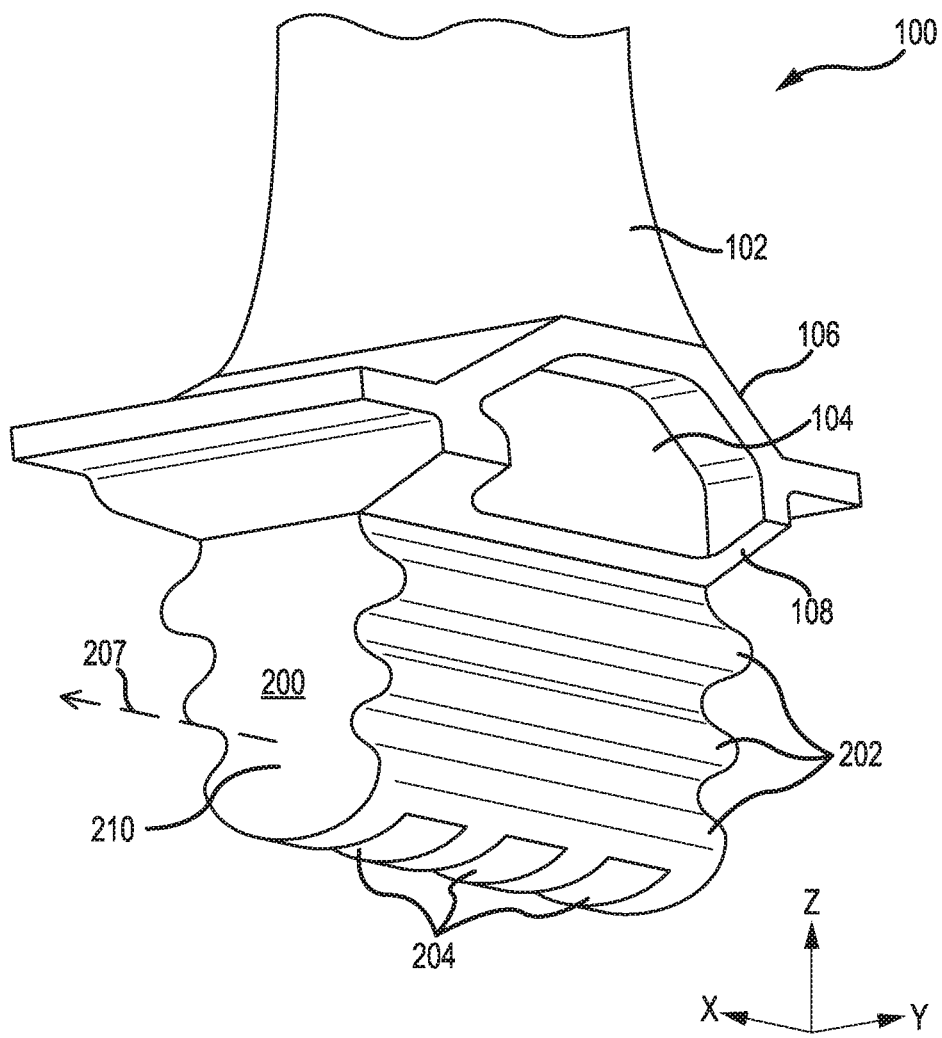
FIG. 2 illustrates a blade assembly, in accordance with various embodiments.

With reference now to FIG. 2, in accordance with various embodiments, a blade assembly 100 comprises an airfoil 102, a platform 104, and a fir tree coupling 200. Airfoil 102 extends from dorsal surface 106 of platform 104. Fir tree coupling 200 includes teeth 202 and rounded base 210 and extends from ventral surface 108 of platform 104. Xyz axes are shown for convenience, with z extending perpendicular to the xy plane. In that regard, a measurement point displaced in the positive z-axis direction from a given reference point may be considered "above" or on "top" of the given reference point. In contrast, a measurement point displaced in the negative z-axis direction from the given reference point may be considered "below" or on "bottom" of the given reference point. In that regard, the terms "top" and "bottom" may refer to relative positions along the z-axis. For example, airfoil 102 is on top of platform 104 and fir tree coupling 200 is below airfoil 102. Channels 204 are cut in the rounded base 210 of fir tree coupling 200.

Figure 3:
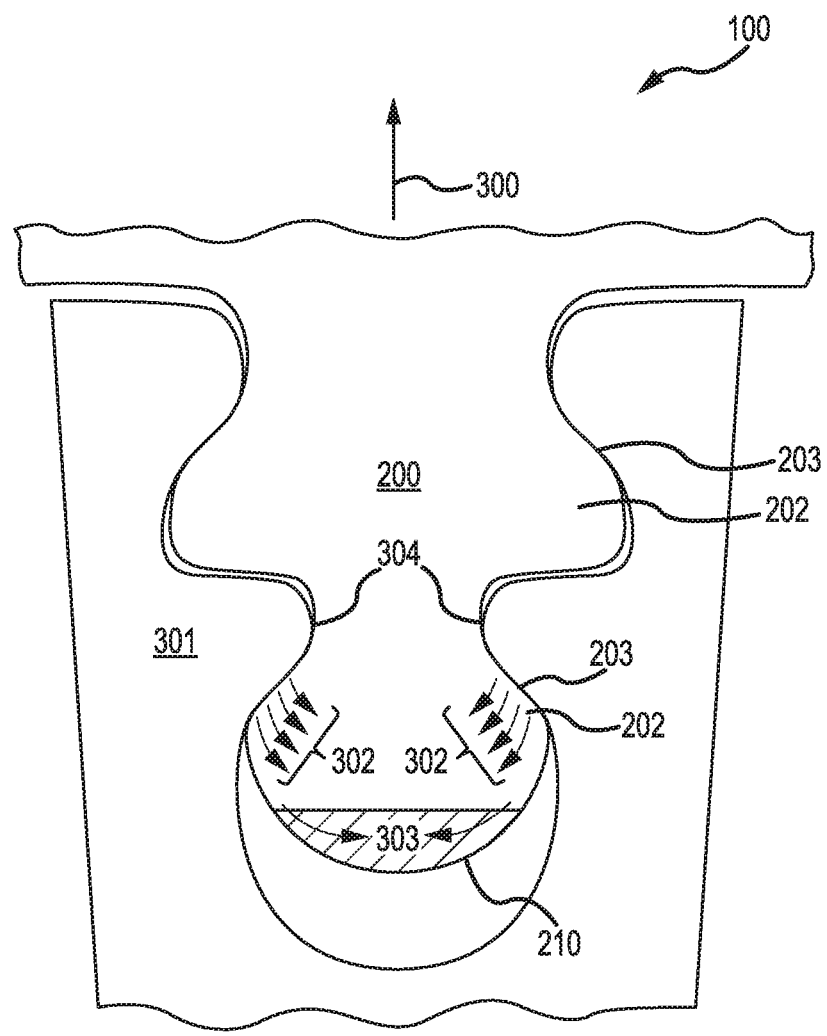
FIG. 3 illustrates a blade assembly at the blade-disk attachment region, in accordance with various embodiments.

With reference now to FIG. 3, a blade-disk attachment region, in accordance with various embodiments, is shown. Blade assembly 100 is inserted into turbine disk 301 and coupled by fir tree coupling 200. As disk 301 rotates at high speed, centrifugal force 300 is generated, which is transmitted into disk 301 at bearing surfaces 203 of teeth 202, tending to induce bending 302, which tends to concentrate stress at attachment fillets 304. The compressive force 303 is resisted by rounded base 210 and tends to reduces stress at attachment fillets 304.

Figure 4:
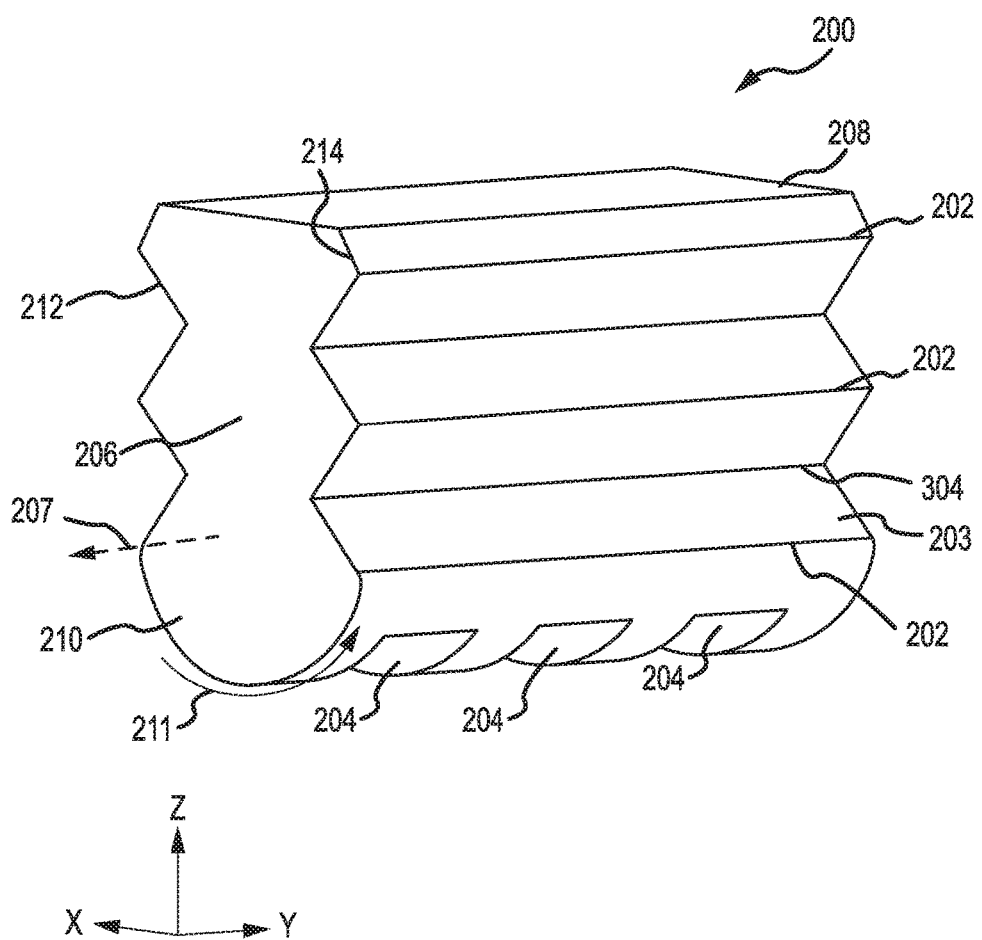
FIG. 4 illustrates a perspective view of a fir tree type coupling, in accordance with various embodiments.

In various embodiments and with reference now to FIG. 4, a fir tree coupling 200 is shown to comprise a load beam 206 having a first side 212 and a second side 214, a rounded base 210 having a radius of curvature 211 from the first side 212 to the second side 214, and a longitudinal axis 207. In various embodiments, the load beam may further comprise a top surface 208. In various embodiments, a plurality of teeth 202 having bearing surface 203 proximate attachment fillet 304 are disposed on the first side 212 and the second side 214 extend laterally (along the y-axis) and run parallel to the longitudinal axis 207 (along the x-axis). Channels 204 are cut across the radius of curvature 211 of rounded base 210 and extend between the first side 121 and second side 214 of the load beam.

In various embodiments, a fir tree coupling may be made of metal, an alloy, nickel, nickel alloy, titanium, or titanium alloy. In various embodiments, a fir tree coupling may be surface treated or may be heat treated by precipitation hardening or age hardening. In various embodiments, a fir tree coupling may be a precipitation-hardening austenite nickel-chromium superalloy such as that sold commercially as Inconel®. In various embodiments, a fir tree coupling may be a single crystal or monocrystalline solid.

Figure 5A:
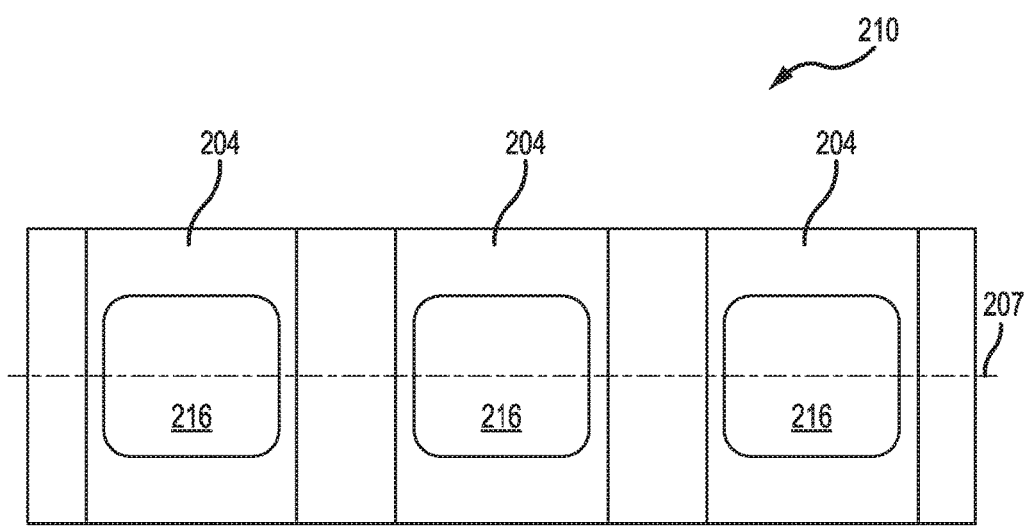
FIG. 5A illustrates the base of a fir tree coupling, in accordance with various embodiments.

In various embodiments and with reference now to FIGS. 2, 5A and 5B, cooling passages 216 in the rounded base of a fir tree coupling such as rounded base 210 may be disposed within channels 204 and extend upward (along the z-axis) from the base through the load beam to a top surface such as top surface 208 of a fir tree coupling. Cooling passages 216 extend radially outward through the airfoil. Cooling passages 216 may have an opening in a rounded base such as rounded base 210 or a in floor of a channel such as channel 204 and may form part of a cooling system for a blade assembly such as blade assembly 100 and be in fluid communication with a second cooling passage disposed within a platform such as platform 104 or an airfoil such as airfoil 102.

Figure 5C:
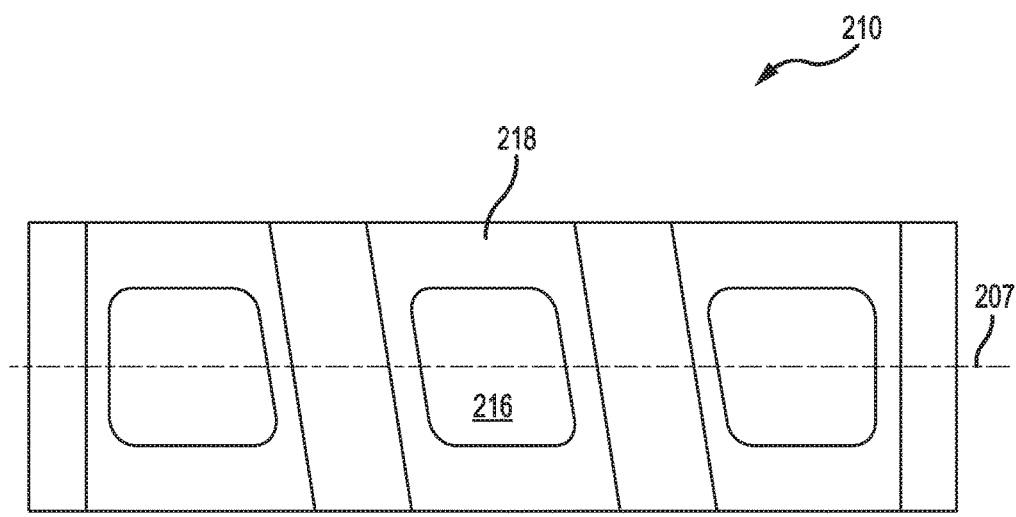
FIG. 5C illustrates the base of a fir tree coupling, in accordance with various embodiments.

In various embodiments and with reference now to FIGS. 5A and 5C, channels such as channels 204 may be perpendicular to the longitudinal axis of a load beam such as longitudinal axis 207. In various embodiments, channels such as channel 218 may be disposed at an angle to the longitudinal axis of a load beam such as longitudinal axis 207. Cooling passages 216 may be skewed relative to the longitudinal axis.

Figure 6A:
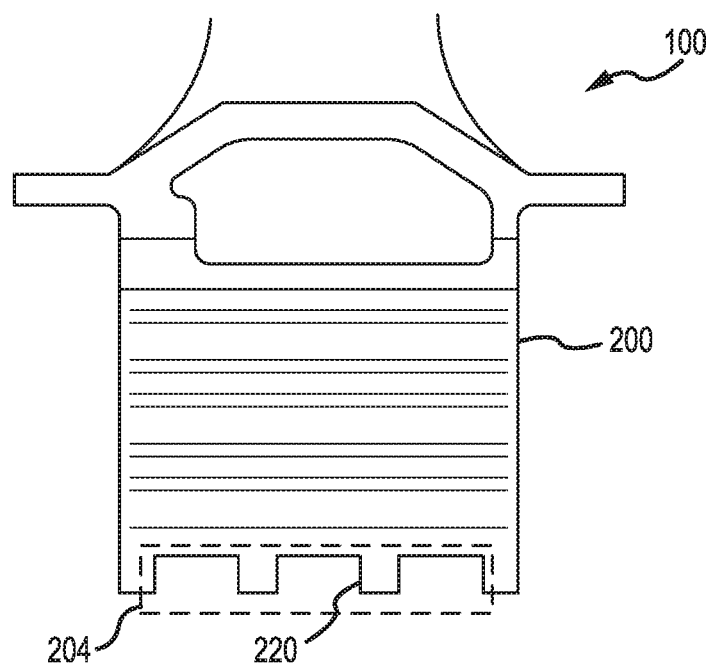
FIG. 6A illustrates the profile of a blade assembly having channels through the rounded base of a fir tree coupling, in accordance with various embodiments.
Figure 6B:
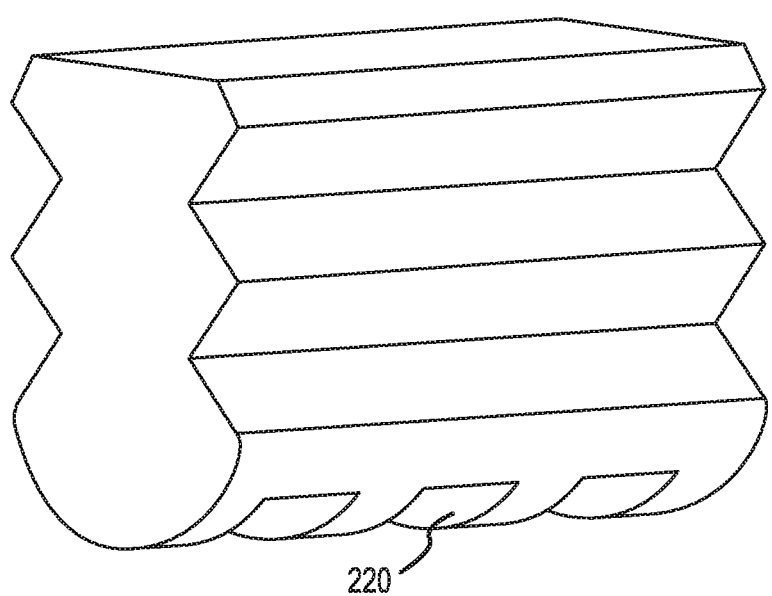
FIG. 6B illustrates a perspective view of a fir tree type coupling, in accordance with various embodiments.

In various embodiments and with reference now to FIGS. 6A and 6B, a blade assembly 600 comprises fir tree coupling 602. Fir tree coupling 602 comprises vertical channels 604 across a portion of the length of the load beam which comprise a vertical sidewall 620 extending into the rounded base perpendicular to the rounded base.

Figure 7A:
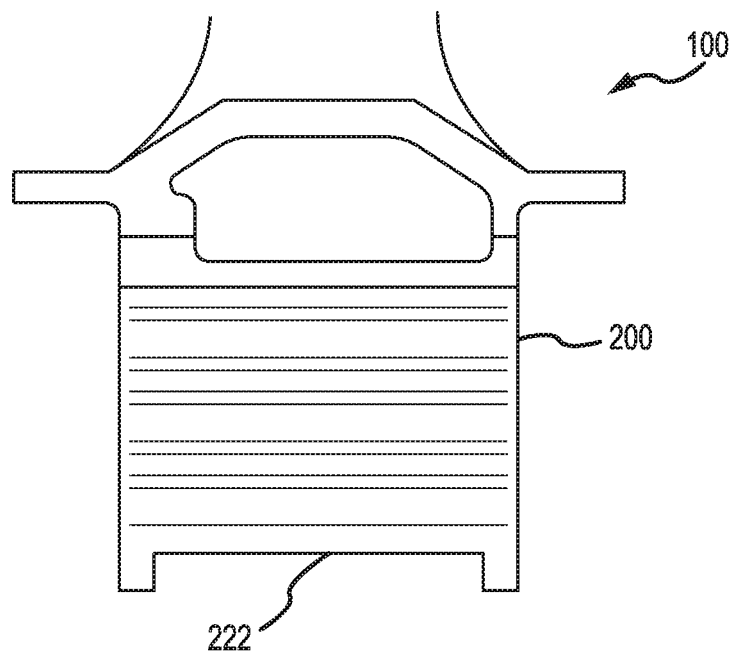
FIG. 7A illustrates the profile of a blade assembly having channels through the rounded base of a fir tree coupling, in accordance with various embodiments.
Figure 7B:
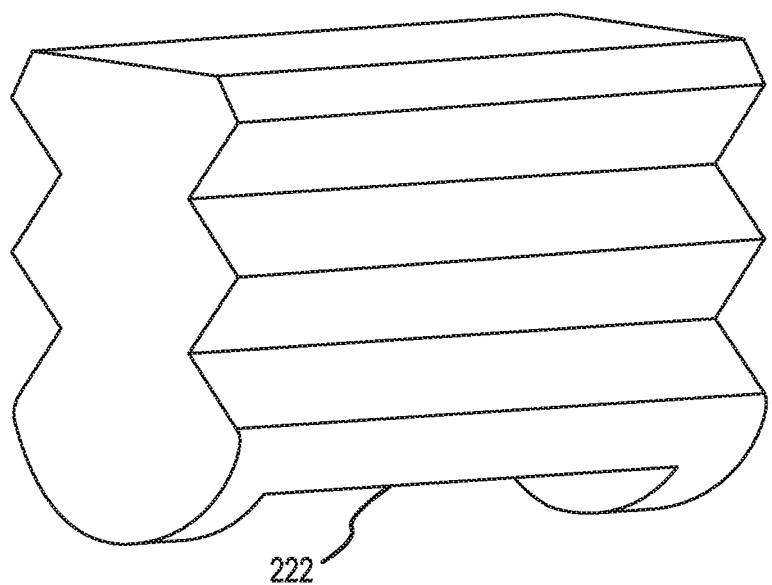
FIG. 7B illustrates a perspective view of a fir tree type coupling, in accordance with various embodiments.

In various embodiments and with reference now to FIGS. 7A and 7B, a blade assembly 700 comprises fir tree coupling 702. Fir tree coupling 702 comprises single, wide channel 722 through the rounded base wherein the wide channel extends nearly the entire length of the load beam except for a first portion 724 and/or a second portion 726 of rounded base left at either end of the wide channel.

Figure 8A:
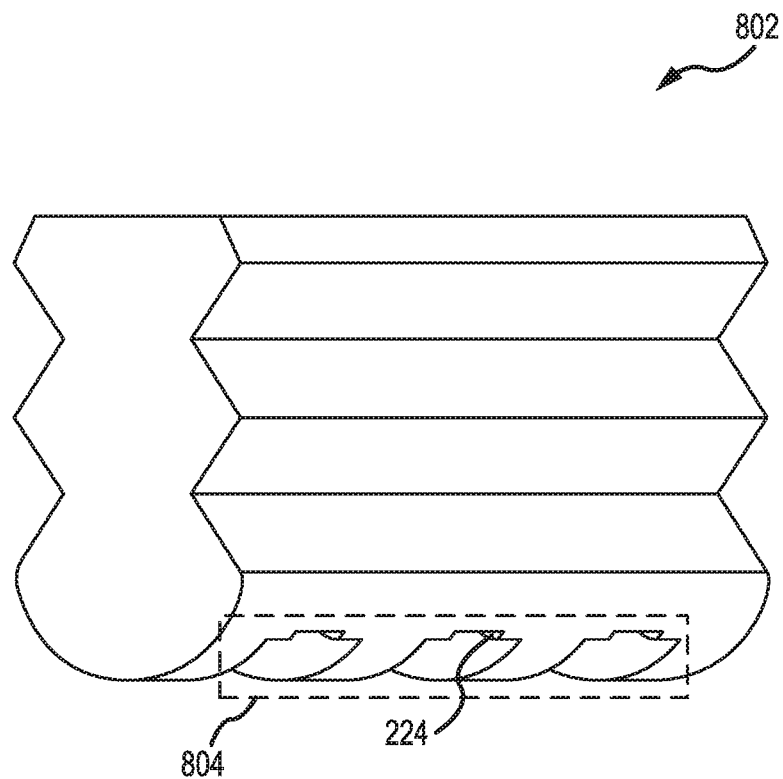
FIG. 8A illustrates a perspective view of a fir tree type coupling, in accordance with various embodiments.
Figure 8B:
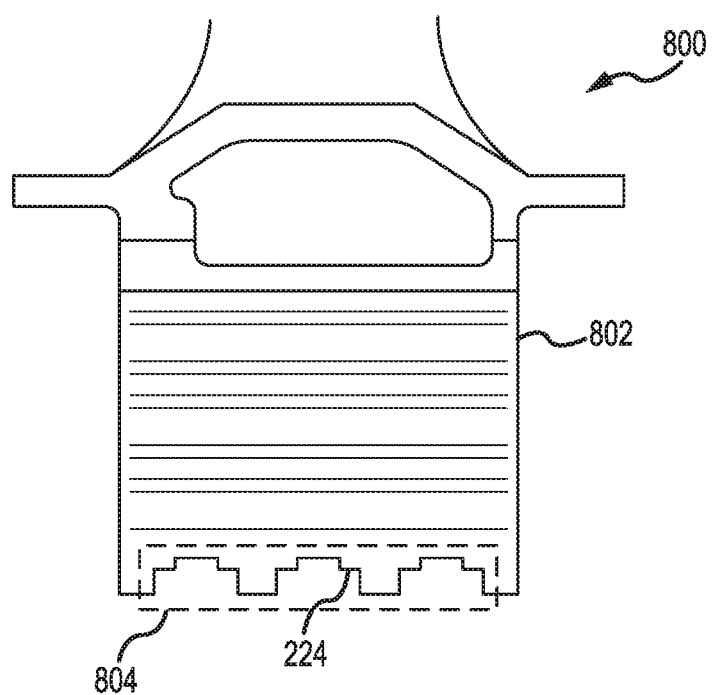
FIG. 8B illustrates the profile of a blade assembly having channels through the rounded base of a fir tree coupling, in accordance with various embodiments.

In various embodiments and with reference now to FIGS. 8A and 8B, a blade assembly 800 comprises fir tree coupling 802. Fir tree coupling 802 comprises stepped channels 804 which comprise a sidewall having a sidewall step 224 cut into a portion of the channel sidewall. In various embodiments, multiple sidewall steps may be present.

Figure 9A:
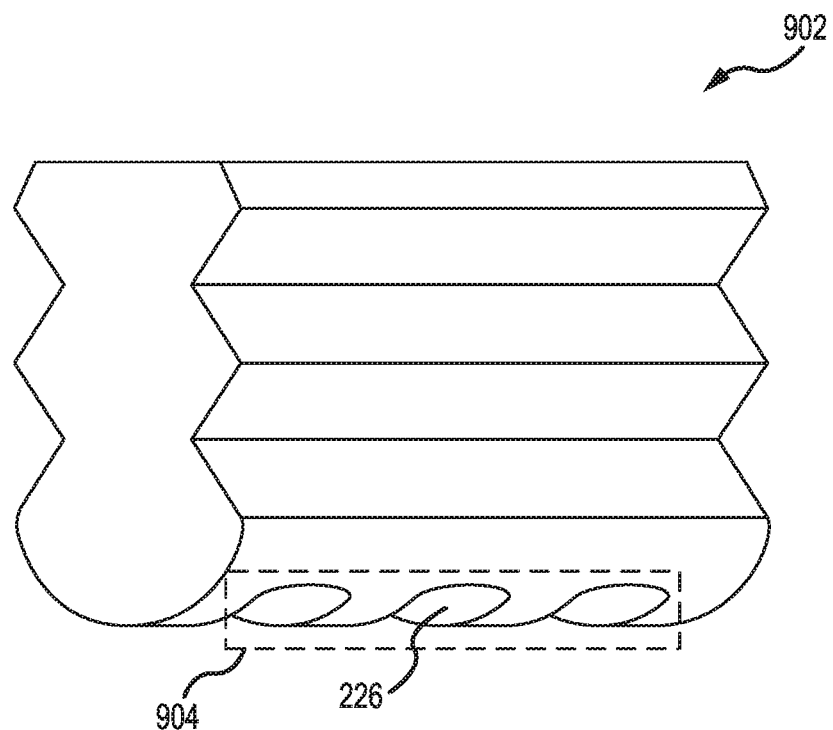
FIG. 9A illustrates a perspective view of a fir tree type coupling, in accordance with various embodiments.
Figure 9B:
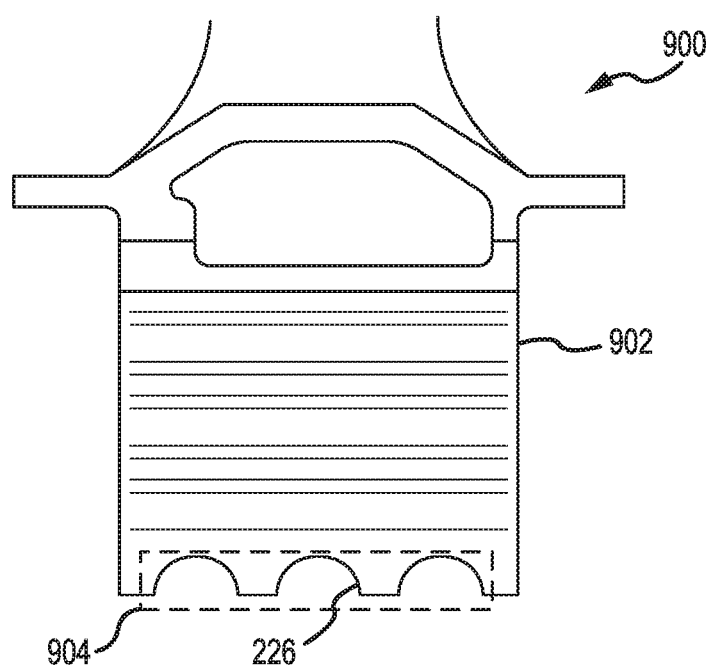
FIG. 9B illustrates the profile of a blade assembly having channels through the rounded base of a fir tree coupling, in accordance with various embodiments.

In various embodiments and with reference now to FIGS. 9A and 9B, a blade assembly 900 comprises fir tree coupling 902. Fir tree coupling 902 comprises channels 904 which comprise a concave sidewall 226 having a concave curvature into the rounded base.

Figure 10A:
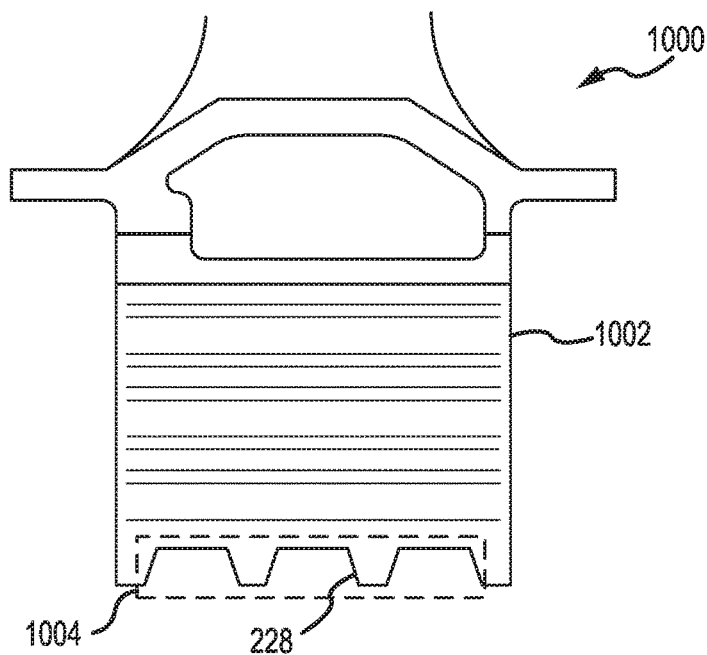
FIG. 10A illustrates the profile of a blade assembly having channels through the rounded base of a fir tree coupling, in accordance with various embodiments.
Figure 10B:
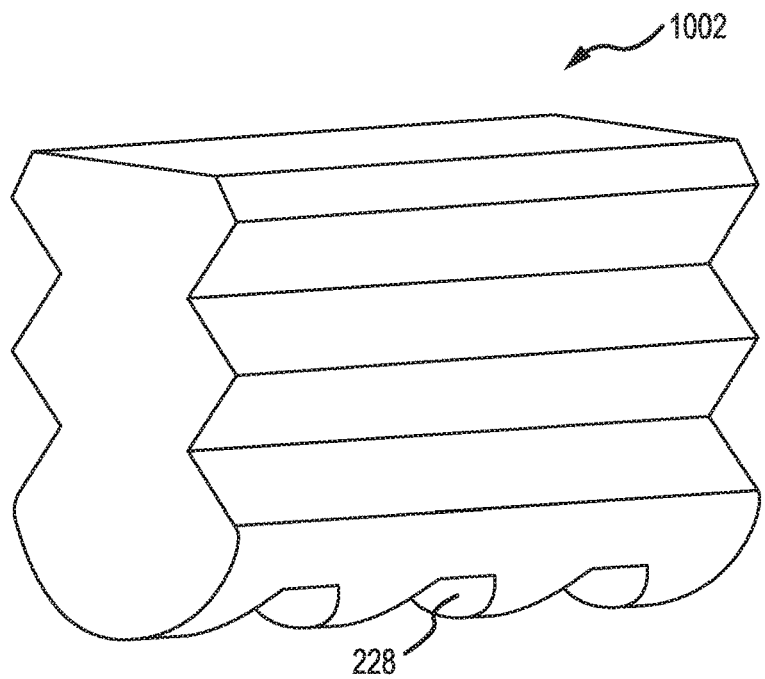
FIG. 10B illustrates a perspective view of a fir tree type coupling, in accordance with various embodiments.

In various embodiments and with reference now to FIGS. 10A and 10B, a blade assembly 1000 comprises fir tree coupling 1002. Fir tree coupling 1002 comprises tapered channels 1004 which comprise a tapered sidewall 228 wherein the tapered sidewall extends at an angle into the rounded base.

Figure 11:
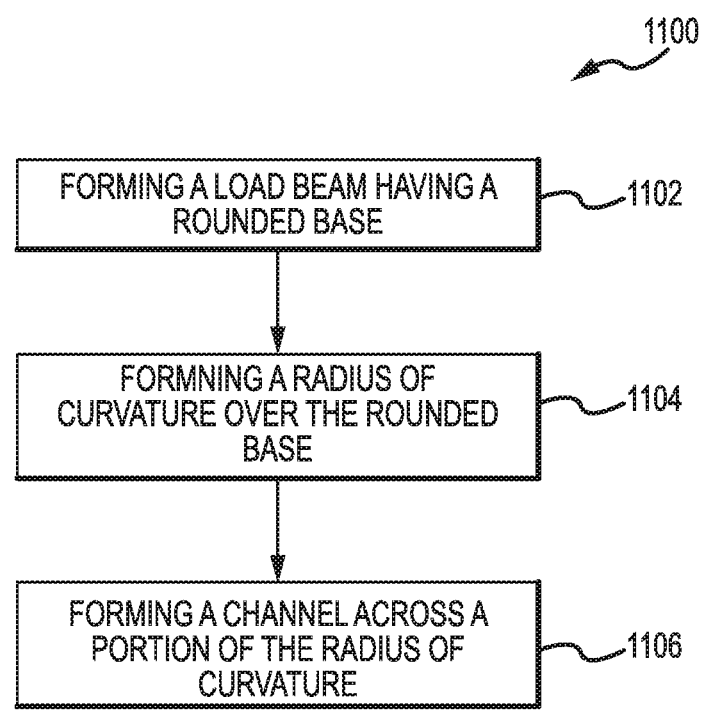
FIG. 11 illustrates a method of manufacturing a fir tree coupling, in accordance with various embodiments.

In various embodiments and with reference now to FIG. 11, a method 1100 of manufacturing a fir tree coupling may comprise forming a load beam 1102 having a longitudinal axis, a rounded base, a first side, a second side, and a tooth running parallel to the longitudinal axis and disposed on the first side of the load beam and, forming a radius of curvature 1104 on the rounded base from the first side to the second side. Forming may comprise subtractive manufacturing such as casting, forging, milling, grinding, machining, and the like. Forming may also comprise additive manufacturing such as electron-beam melting, selective laser sintering, electron-beam freeform fabrication, and the like. Forming may also comprise joining, such as welding, brazing and/or other suitable methods. The method may further comprise forming a channel 1106 through the rounded base across a portion of the radius of curvature from the first side to the second side of the load beam.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fir tree coupling comprising: a load beam having a longitudinal axis, a rounded base, a first side, and a second side, wherein the rounded base has a radius of curvature from the first side to the second side, a tooth running parallel to the longitudinal axis and disposed on the first side of the load beam, and a plurality of channels, extending transverse to the longitudinal axis from the first side to the second side of the load beam, defining a plurality of rounded base portions therebetween.

2. The fir tree coupling of claim 1, wherein the plurality of channels comprises a sidewall having a sidewall step cut into a portion of the sidewall.

3. The fir tree coupling of claim 1, wherein the plurality of channels comprises at least one of a concave sidewall having a concave curvature into the plurality of rounded base portions or a vertical sidewall extending perpendicular into the rounded base from the plurality of rounded base portions.

4. The fir tree coupling of claim 1, wherein the plurality of channels comprises a tapered sidewall wherein the tapered sidewall extends at a non-orthogonal angle into the rounded base from the plurality of rounded base portions.

5. The fir tree coupling of claim 1, wherein the plurality of channels is disposed at a non-orthogonal angle to the longitudinal axis of the load beam.

6. The fir tree coupling of claim 1, wherein the tooth includes a bearing surface.

7. The fir tree coupling of claim 1, wherein the load beam comprises a top surface and a cooling passage passing through the load beam from the rounded base to the top surface.

8. The fir tree coupling of claim 1, wherein the load beam comprises at least one of nickel, nickel alloy, titanium, or titanium alloy.

9. The fir tree coupling of claim 1, wherein the load beam comprises a monocrystalline material.

10. A turbine blade assembly for a gas turbine engine comprising:
a platform having a dorsal surface and a ventral surface;
a turbine blade extending from the dorsal surface;

a fir tree coupling extending from the ventral surface, the fir tree coupling comprising a load beam having a longitudinal axis, a rounded base, a first side, and a second side, wherein the rounded base has a radius of curvature from the first side to the second side, a tooth running parallel to the longitudinal axis and disposed on the first side of the load beam, and a plurality of channels, extending transverse to the longitudinal axis from the first side to the second side of the load beam, defining a plurality of rounded base portions therebetween.

11. The turbine blade assembly of claim 10, wherein the plurality of channels comprises a sidewall having a sidewall step cut into a portion of the sidewall.

12. The turbine blade assembly of claim 10, wherein the plurality of channels comprises at least one of a concave sidewall having a concave curvature into the plurality of rounded base portions or a vertical sidewall extending perpendicular into the rounded base from the plurality of rounded base portions.

13. The turbine blade assembly of claim 10, wherein, the plurality of channels comprises a tapered sidewall wherein the tapered sidewall extends at a non-orthogonal angle into the rounded base from the plurality of rounded base portions.

14. The turbine blade assembly of claim 10, wherein the plurality of channels is disposed at a non-orthogonal angle to the longitudinal axis of the load beam.

15. The turbine blade assembly of claim 10, wherein the fir tree coupling comprises at least one of nickel, nickel alloy, titanium, or titanium alloy.

16. The turbine blade assembly of claim 10, wherein the fir tree coupling comprises a monocrystalline material, wherein the fir tree coupling comprises a first cooling passage in fluid communication with a second cooling passage within at least one of the platform or the turbine blade.

17. A method of manufacturing a fir tree coupling comprising:

forming a load beam having a longitudinal axis, a rounded base, a first side, a second side, and tooth running parallel to the longitudinal axis and disposed on the first side of the load beam, forming a radius of curvature on the rounded base from the first side to the second side, and forming a plurality of channels, extending transverse to the longitudinal axis from the first side to the second side of the load beam and across the radius of curvature, defining a plurality of rounded base portions therebetween.

18. The method of claim 17, wherein the plurality of channels is disposed at a non-orthogonal angle to the longitudinal axis of the load beam.

* * * * *